United States Patent
Dar et al.

(10) Patent No.: US 11,704,034 B2
(45) Date of Patent: *Jul. 18, 2023

(54) LOAD BALANCING IN A STORAGE SYSTEM

(71) Applicant: EMC IP Holding Company LLC, Hopkinton, MA (US)

(72) Inventors: Shaul Dar, Petach Tikva (IL); Avitan Gefen, Tel Aviv (IL); Amihai Savir, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,155

(22) Filed: Oct. 31, 2022

(65) Prior Publication Data
US 2023/0046538 A1 Feb. 16, 2023

Related U.S. Application Data

(63) Continuation of application No. 17/244,733, filed on Apr. 29, 2021, now Pat. No. 11,487,453.

(51) Int. Cl.
*G06F 3/06* (2006.01)
*G06F 9/50* (2006.01)
*G06F 18/22* (2023.01)

(52) U.S. Cl.
CPC ............ *G06F 3/0635* (2013.01); *G06F 3/067* (2013.01); *G06F 3/0619* (2013.01); *G06F 3/0647* (2013.01); *G06F 3/0653* (2013.01); *G06F 3/0659* (2013.01); *G06F 9/5083* (2013.01); *G06F 18/22* (2023.01)

(58) Field of Classification Search
CPC .... G06F 3/0635; G06F 3/0619; G06F 3/0653; G06F 3/06559; G06F 3/067; G06F 3/0647; G06F 9/5083; G06K 9/6215
See application file for complete search history.

(56) References Cited

U.S. PATENT DOCUMENTS

| | | | |
|---|---|---|---|
| 2015/0081911 A1* | 3/2015 | Li | G06N 3/126 709/226 |
| 2017/0052712 A1* | 2/2017 | Sebbah | G06F 3/0611 |
| 2018/0121100 A1* | 5/2018 | Auvenshine | G06F 3/0611 |

* cited by examiner

*Primary Examiner* — Nicholas J Simonetti
(74) *Attorney, Agent, or Firm* — Krishnendu Gupta; Deepika Bhayana; Derek Lam

(57) ABSTRACT

Techniques are used for balancing load on a storage system according to multiple variables. The techniques may be used to provide, among other things, defining, across at least two variables, a balance constraint for a load on a storage system. Among a set of transfers of volumes from one node to another node in the storage system, a transfer of a volume that minimizes the distance between the load and an ideal balanced state of the storage system is identified. The identified transfer of a volume is added to a combination of transfers of volumes. Whether the combination of transfers of volumes meets the balance constraint is determined. If the combination meets the balance constraint, the combination is selected as a solution to balance the load.

11 Claims, 8 Drawing Sheets

LOAD BALANCING IN A STORAGE SYSTEM

REFERENCE TO RELATED APPLICATIONS

This application is a continuation of U.S. patent application Ser. No. 17/244,733, entitled "LOAD BALANCING IN A STORAGE SYSTEM" and filed Apr. 29, 2021, the contents of which are incorporated by reference herein in their entirety for all purposes.

BACKGROUND

Technical Field

This application concerns load balancing in storage systems by identifying a combination of transfers of volumes between nodes to meet a balance constraint across multiple variables.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices may be organized into multiple nodes. The storage devices and the hosts may be connected to one another over one or more computer networks.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method that includes defining, across at least two variables, a balance constraint for a load on a storage system. Among a set of transfers of volumes from one node to another node in the storage system, a transfer of a volume that minimizes the distance between the load and an ideal balanced state of the storage system is identified. The identified transfer of a volume is added to a combination of transfers of volumes. Whether the combination of transfers of volumes meets the balance constraint is determined. If the combination meets the balance constraint, the combination is selected as a solution to balance the load.

Another aspect of the current technique is a system with at least one processor. At least one processor is configured to define, across at least two variables, a balance constraint for a load on a storage system. The at least one processor is configured to identify, among a set of transfers of volumes from one node to another node in the storage system, a transfer of a volume that minimizes the distance between the load and an ideal balanced state of the storage system. The at least one processor adds the identified transfer of a volume to a combination of transfers of volumes. The at least one processor determines whether the combination of transfers of volumes meets the balance constraint. If the combination meets the balance constraint, the at least one processor selects the combination as a solution to balance the load.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
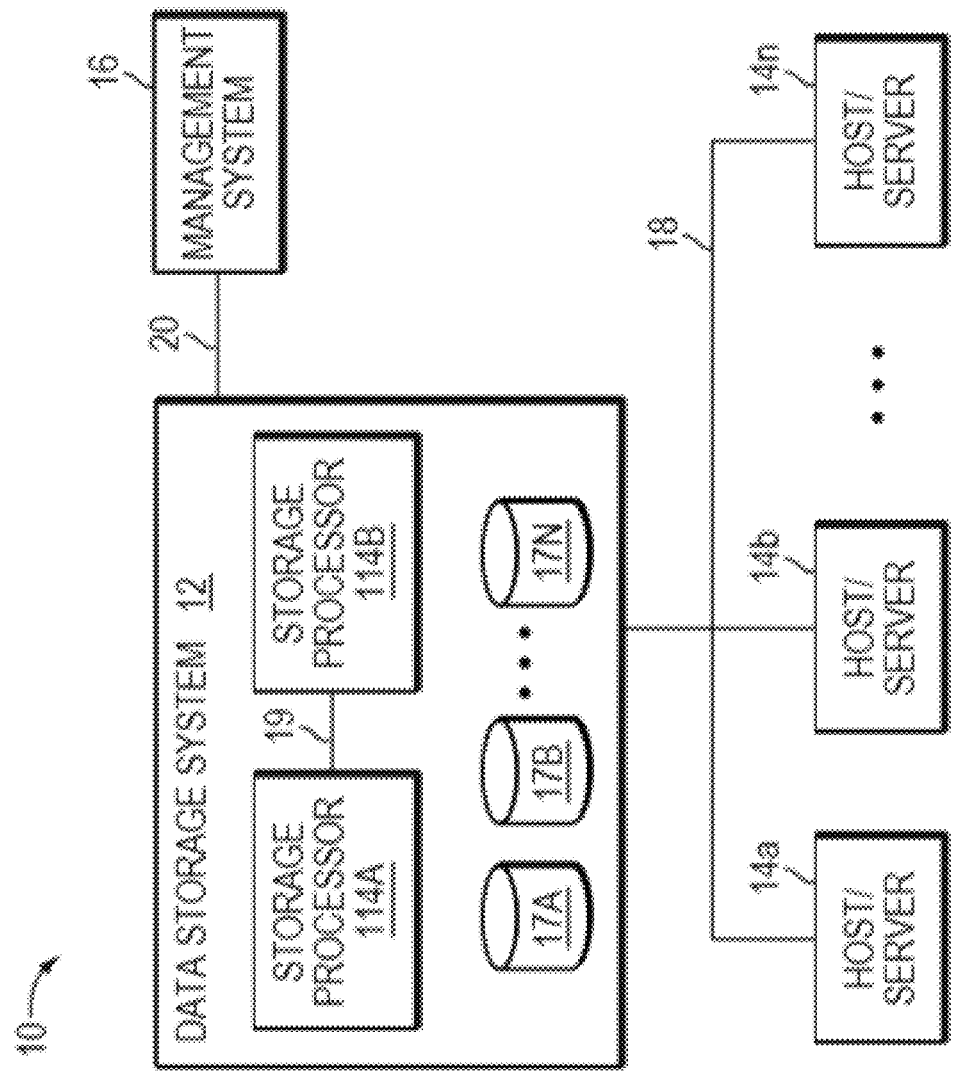
FIG. 1 depicts an exemplary embodiment of a computer system that may be used in connection with performing the techniques described herein.

Described below is a technique which may be used to provide, among other things, defining, across at least two variables, a balance constraint for a load on a storage system. Among a set of transfers of volumes from one node to another node in the storage system, a transfer of a volume that minimizes the distance between the load and an ideal balanced state of the storage system is identified. The identified transfer of a volume is added to a combination of transfers of volumes. Whether the combination of transfers of volumes meets the balance constraint is determined. If the combination meets the balance constraint, the combination is selected as a solution to balance the load.

In servicing requests from hosts, or in the course of running storage operations, storage systems execute numerous input/output (I/O) operations, such as read and write. To maximize performance, the storage system distributes I/O operations. For example, the load may be balanced between two nodes in an appliance, or across all of the appliances in a cluster. Re-distribution may be accomplished by transferring ownership of a volume of data, such that the new owner assumes responsibility of all the I/O operations pertaining to that volume.

Conventional approaches to load balancing approach read and write operations as equivalent. However, write operations generally consume more computing resources than read operations, and the amount of resources required can vary based on the amount of data in the I/O requests, among other considerations. In some instances, the difference in resource consumption between read and write operations on the same amount of data may vary by a factor between 1.2-2.2. Thus, there is no straightforward manner to ensure that write requests and read requests are accounted for based on their resource consumption.

Other conventional approaches to load balancing approach assess the impact of transferring a volume based on a single variable. For example, an approach may assess solely the amount of processor time or processor cycles consumed by the individual nodes in the storage system. However, a single variable is typically inadequate to measure the magnitude of the load on any given node.

Embodiments of the techniques described herein enable load in a storage system to be balanced more accurately by balancing load across the storage system according to multiple variables. Although examples are discussed in terms of read and write operations, which are separately considered by the solution described herein, the solution may be extended to other variables, such as deduplication activity, wear level of cells, number of CPUs and usage thereof, and amount of available random-access memory (RAM), among others. Constraints under which the load would be considered balanced are defined, and each prospective transfer of a volume would be evaluated for its impact on the distribution of the load. A search is conducted for the optimal combination of transfers that would balance the load, in accordance with the balance constraints, and the volumes are transferred in accordance with the optimal combination found.

In at least some implementations in accordance with the techniques as described herein, one or more of the following advantages can be provided: improved performance of the storage system, and more accurate balancing of the load across the storage system.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units (also referred to herein as "cores"). Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Although FIG. 1 depicts two storage processors 114A, 114B, various embodiments of the invention may include any number of storage processors 114. The storage processors 114 may be distributed across computing devices, such as appliances. The storage system 12 may have any number of such computing devices, each of which may have any number of storage processors 114. In some embodiments, the computing devices are grouped into clusters.

Figure 2:
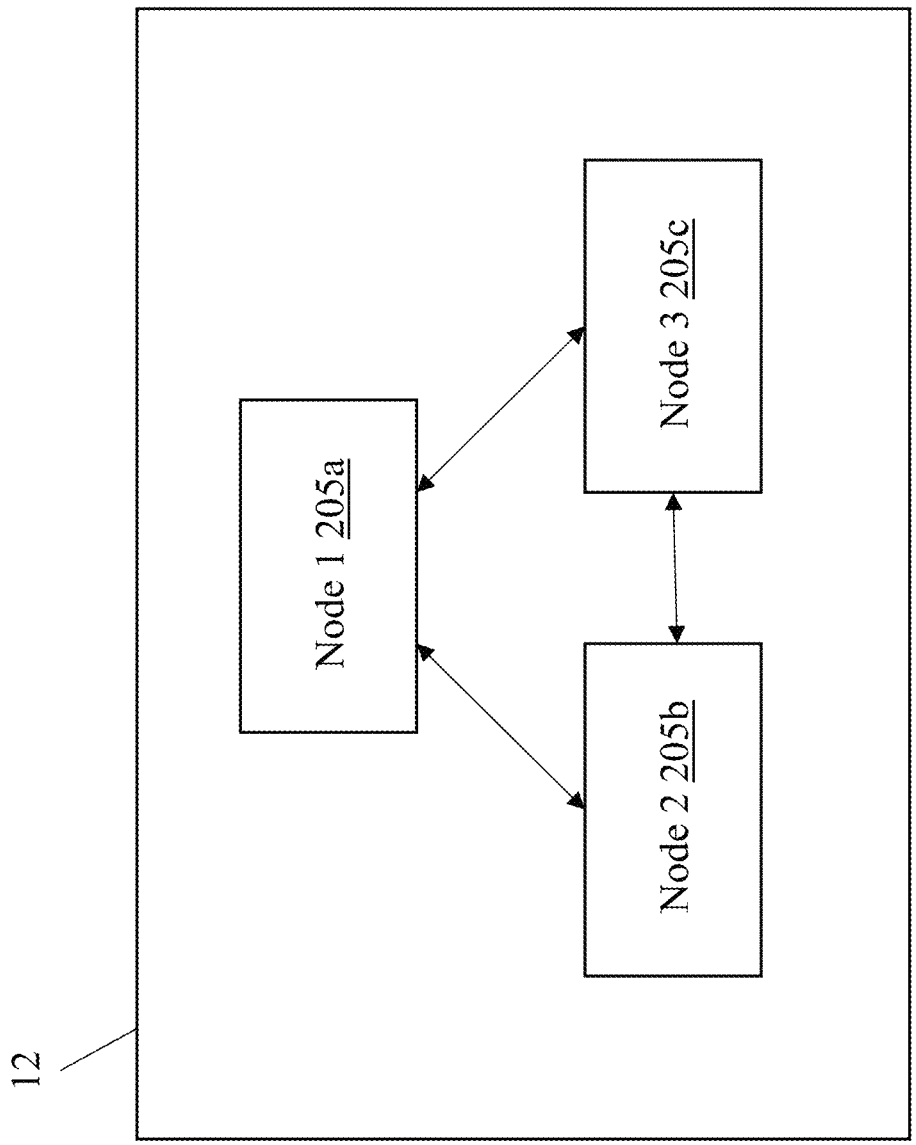
FIG. 2 is a block diagram depicting exemplary entities in the storage system among which the load can be balanced.

FIG. 2 is a block diagram depicting exemplary entities in the storage system 12 among which the load can be balanced. Although FIG. 1 depicts three nodes 205a, 205b, 205c, various embodiments of the invention may include any number of nodes. In one example, the nodes 205a, 205b, 205c may be three appliances in a cluster. In another example, the nodes 205a, 205b, 205c may be three storage processors 114 on a single appliance. Moreover, the storage system 12 may have multiple groups of nodes 205, and load may be balanced across the nodes 205 in a group as well as across the groups themselves. For example, a storage system 12 may have six (6) appliances, each of which has sixty four (64) storage processors 114. Load may be balanced across the 6 appliances, and within a single appliance, load may be balanced across the 64 storage processors 114.

As previously explained, load may be adjust be transferring ownership of a volume. In some embodiments, changing volume affinity on a host 14 can achieve the transfer. In other embodiments, data may be migrated from one appliance to another to transfer ownership of a volume.

To balance a load, constraints under which the load would be considered balanced (also referred to herein as "balance constraints") are defined. An exemplary balance constraint for balancing read and write operations across two nodes 205 is $\{q, 1-q\}$, wherein $0.5<q<1$. Under this constraint, one node 205a should perform at most (q) of the read and write operations and the other node should perform no less than (1−q). Thus, if q=0.6, for the load to be balanced, one node 205a should perform at most 60% of the total read operations and 60% of the total write operations, and the other node 205b should perform no less than 40% of the same. In other embodiments, read and write operations may be subject to different balance constraints (e.g., 55% for write operations, 65% for read operations).

Figure 3:
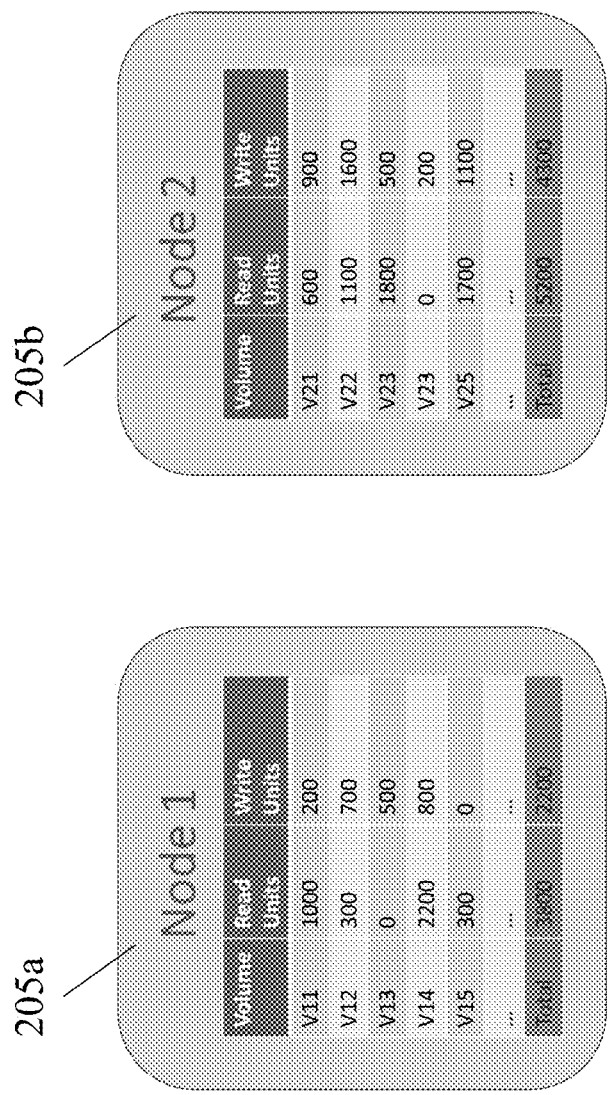
FIG. 3 is an exemplary distribution of a load on two nodes of the data storage system of FIG. 1.

FIG. 3 is an exemplary distribution of a load on two nodes 205a, 205b of the data storage system of FIG. 1. In this example, the two nodes 205a, 205b each own five volumes. The storage system 12 may evaluate the read and write units performed by the nodes 205a, 205b over a time interval, such as 15 minutes. During this time, the volumes owned by node 205*a* have incurred 3800 read units and 2200 write units, while the volumes owned by node 205*b* have incurred 5200 read units and 4300 write units. Thus, the nodes 205*a*, 205*b* are collectively performing 9000 read units and 6500 write units, and node 205*a* is performing 42% of the read writes and 34% of the write units. In an example in which q=0.6, the nodes 205*a*, 205*b* are balanced with respect to read requests, but not write requests.

Figure 4:
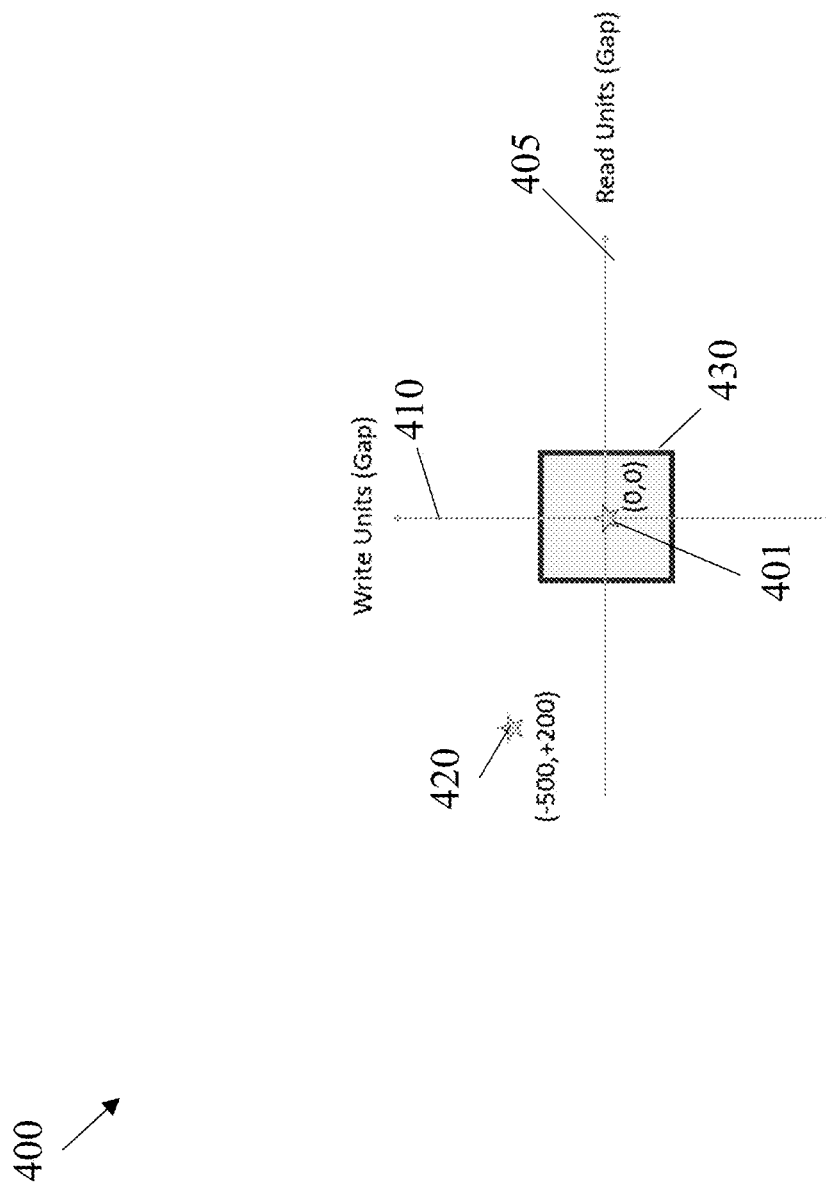
FIG. 4 illustrates an exemplary manner of representing the distribution of a load of the data storage system of FIG. 1.

FIG. 4 illustrates an exemplary manner of representing the distribution of a load of the data storage system of FIG. 1. The origin (0, 0) 401 corresponds to an ideal, balanced state, in which two nodes 205*a*, 205*b* each assume 50% of the read and write units. The X-axis 405 corresponds to the difference between two nodes 205*a*, 205*b* for one variable (i.e., read units), whereas the Y-axis 410 corresponds to the difference for the other variable (i.e., write units). Thus, data point 420 corresponds to a state in which node 205*a* has executed 500 fewer read units than node 205*b* over a time internal, but 200 more write units. The rectangle 430 centered around the origin (0, 0) 401 corresponds to the balance constraint {q, 1-q}. For the load to be balanced under these constraints, ownership of volumes must be transferred such that the differences between the loads of the nodes 205*a*, 205*b* fall within the rectangle 430.

Figure 5:
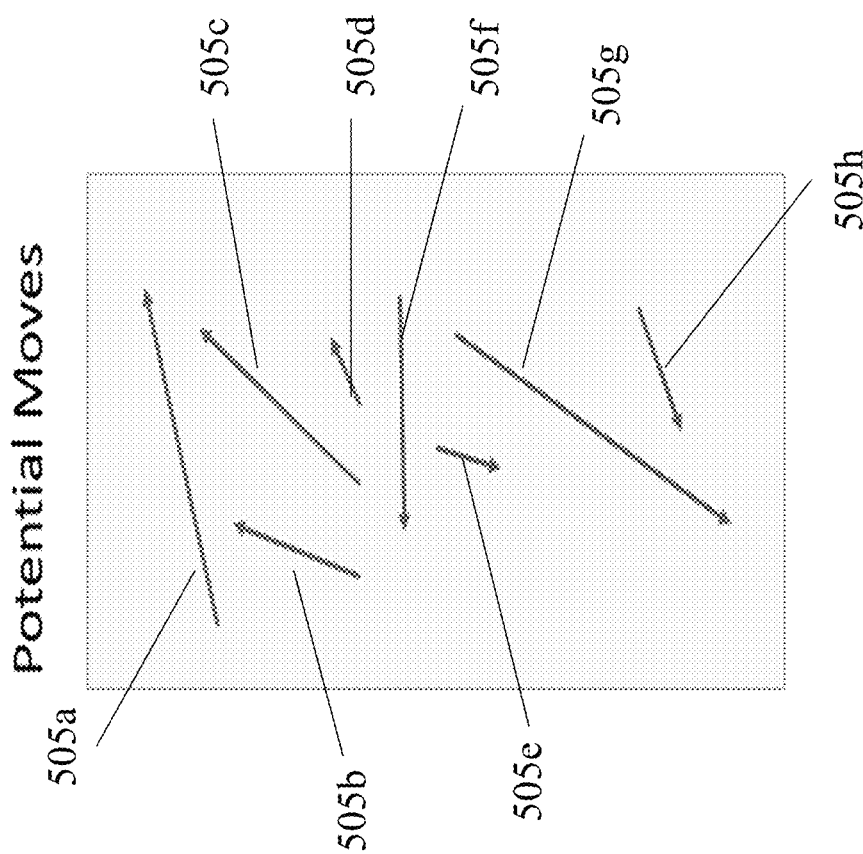
FIG. 5 illustrates an exemplary manner of representing the impact on the distribution of the load of the data storage system of FIG. 1 that would be accomplished by changing the ownership of particular volumes.

FIG. 5 illustrates an exemplary manner of representing the impact on the distribution of the load of the data storage system of FIG. 1 that would be accomplished by changing the ownership of particular volumes. Each difference can be represented by a vector 505*a*-505*h*. In this example, vectors 505*a*-505*d* indicate that transferring certain volumes from node 205*b* to node 205*a* would increase both the read and write units that node 205*a* performs, whereas vectors 505*e*-505*h* indicate that transferring any of the other volumes from node 205*b* to node 205*a* would decrease the read and write units that node 205*b* performs.

Figure 6:
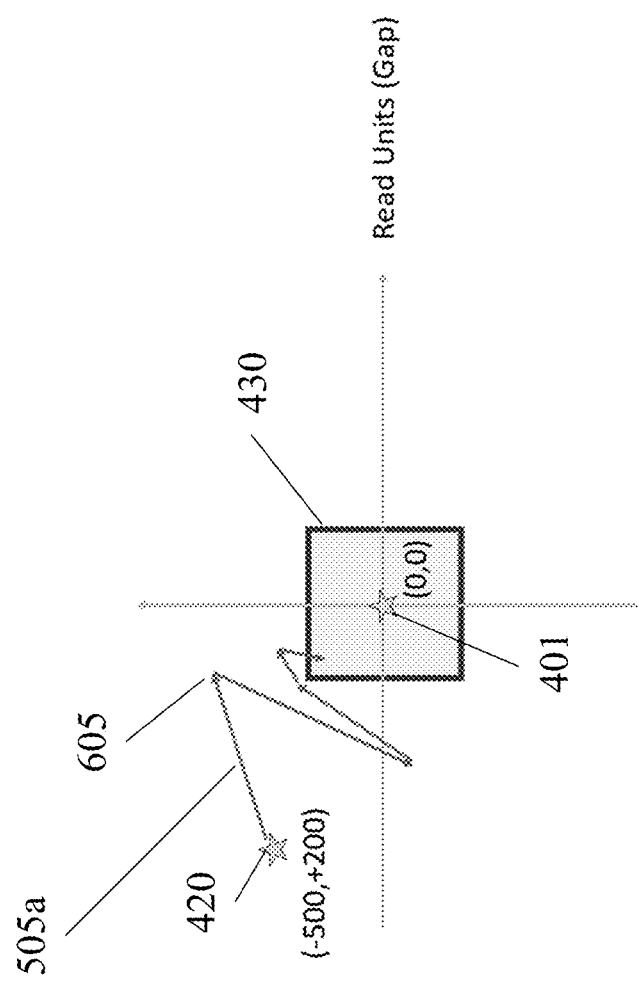
FIG. 6 illustrates an exemplary manner of representing how a particular set of changes to the affinities of volumes would balance the load of the data storage system of FIG. 1.

FIG. 6 illustrates an exemplary manner of representing how a particular set of changes to the affinities of volumes would balance the load of the data storage system of FIG. 1. The vectors 505 of this combination of volume transfers enables the difference between read and write units executed by the nodes 205*a*, 205*b* to fall within the balance constraint. This is represented by the state of the storage system 12 falling within the rectangle 430.

In some embodiments, the desired combination of volume transfers that achieves load balance is the combination that involves the fewest number of transfers. To determine this combination, each transfer's corresponding vector 505 is assessed for its ability to bring the load closer to the ideal, balanced state, as represented by the origin (0,0) 401. The distance between the prospective adjusted load of the storage system 12 and the origin (0,0) 401 may be, for example, the Euclidean distance or the Manhattan distance between the two points.

The volume transfer whose corresponding vector 505 would bring the load closest to the origin (0,0) 401 is selected for the final combination of volume transfers. Referring to the example in FIG. 6, the volume transfer corresponding to vector 505*a* would bring the state of the storage system 12 from point 420 to point 605. In this example, the distance between point 605 and the origin (0,0) 401 is smaller than the distances that would be achieved by any other volume transfer, so the transfer corresponding to vector 505*a* is selected. In this manner, the single volume transfer that would bring the load closest to the balance constraint is selected first.

Selection of one volume transfer changes the prospective state of the storage system 12. The remaining vectors 505*b*-505*h* are assessed for their ability to bring the prospective new load, as represented by point 605, closer to the origin (0,0) 401. The volume transfer whose vector 505 results in the smallest distance to the origin (0,0) 401 is selected for the final combination of volume transfers.

In some embodiments, the process is repeated until the prospective state of the storage system 12 meets the balance constraint. Even after the balance constraint is met, remaining volume transfers may still be evaluated for their ability to bring the load closer to the ideal, balanced state. In some embodiments, prospective volume transfers are considered until no further volume transfer would bring the load closer to the ideal, balanced state. Alternatively, the number of additional volume transfers may be limited by a pre-determined threshold, e.g., at most, two more volume transfers may be added to the final combination of volume transfers after a combination that meets the balance constraint has been identified. In various embodiments, further consideration of volume transfers may be limited by an allotment of computing resources. For example, a pre-determined number of storage processor 114 cycles or time may be expended on identifying additional volume transfers to balance the load further, but the effort is suspended or abandoned after the allotment has been consumed.

In various embodiments, the process is repeated a predetermined number of times. Referring to the example in FIG. 3, the two nodes 205*a*, 205*b* collectively own ten (10) volumes, and each node 205*a*, 205*b* owns five (5) volumes. The number of volume transfers in the final combination may be capped at two (2). Thus, even if two volume transfers do not result in a load that meets the balance constraint, no further transfers may be performed. In some embodiments, the number of volume transfers may be limited to a percentage of the total number of volumes owned by the storage system 12, such as 20%.

In other embodiments, instead of iteratively finding volume transfers to bring the load closer to the ideal, balanced state, all possible combinations of volume transfers are considered as an initial population of possible solutions. A fitness function is applied to the possible combinations to define each combination's fitness for balancing the load of the storage system 12. For example, each combination may be evaluated for its distance to the ideal, balanced state, as well as its number of volume transfers. The combination with the highest score may be selected as the volumes to transfer to balance the load. Alternatively, combinations whose fitness score meet a threshold may be considered for the next population of possible solutions. Using the fitness function, the population of possible solutions may be iteratively improved until a final solution is selected.

Figure 7:
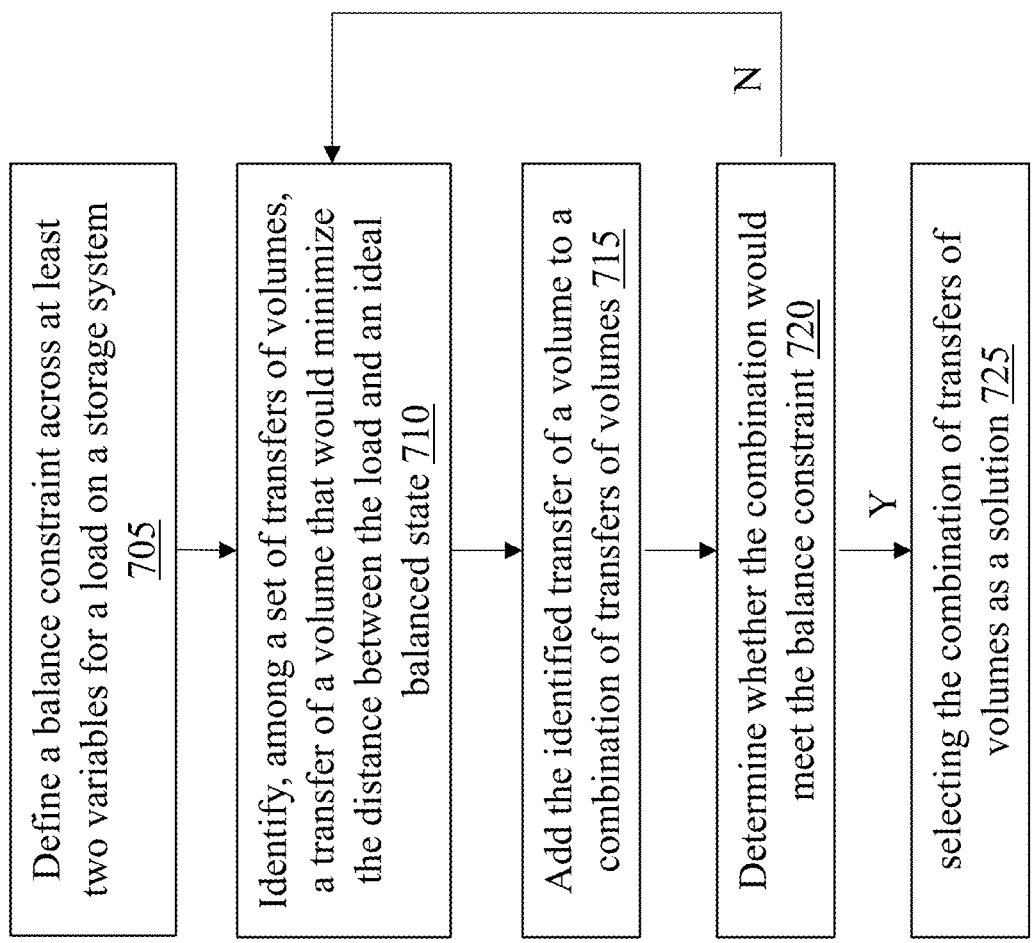
FIGS. 7-8 are flow diagrams for exemplary methods of improving load on a storage system of FIG. 1.
Figure 8:
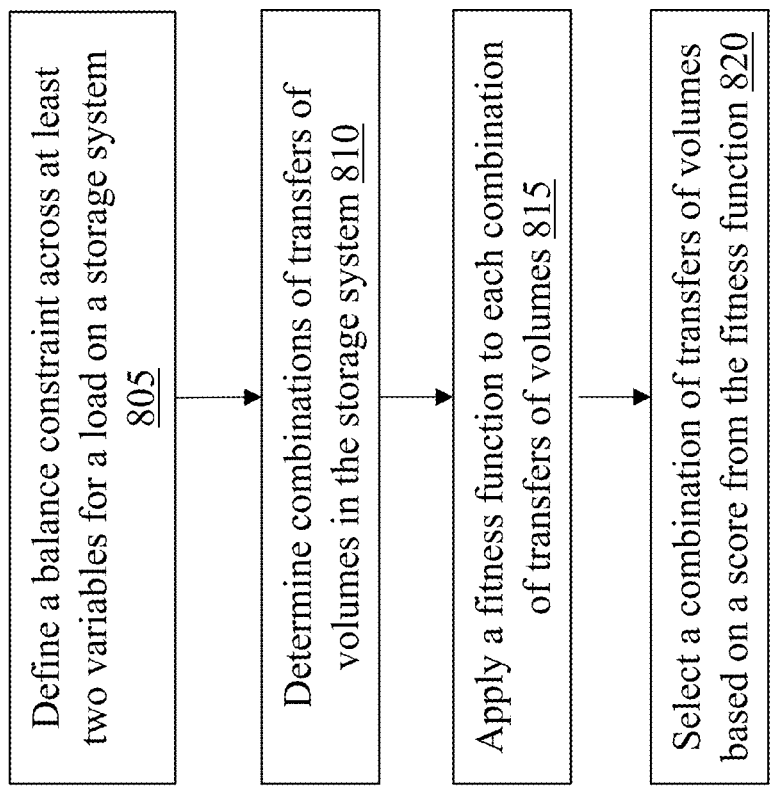

FIGS. 7-8 are flow diagrams for exemplary methods of improving load on a storage system 12. In the method described in FIG. 7, a balance constraint across at least two variables for a load on a storage system is defined (step 705). Among a set of transfers of volumes, a transfer of a volume that would minimize the distance between the load and an ideal balanced state is identified (step 710). The identified transfer of a volume is added to a combination of transfers of volumes (step 715). The combination's ability to meet the balance constraint is determined (step 720). If so, the combination is saved as a solution (step 725).

If not, then among the set of remaining transfers of volumes, a transfer of a volume is identified that would minimize the distance between the updated load and the ideal balanced state (step 710). This transfer of a volume is added to the combination of transfers of volumes (step 715), and the ability of the augmented combination is evaluated for whether the balance constraint would be met (step 720). Steps 710-720 are repeated until the load achieved by the combination of transfers of volumes meets the balance constraint, at which point the combination of transfers of volumes is saved as a solution (step 725).

In the method described in FIG. 8, a balance constraint across at least two variables for a load on a storage system is defined (step 805). Combinations of transfers of volumes in the storage system are defined, as an initial population of prospective solutions (step 810). A fitness function is applied to each such defined combination (step 815). In some embodiments, the fitness function measures the distance between the load as adjusted by the combination of volume transfers and the ideal balanced state and/or the number of volume transfers required by the combination. These measurements are used to score each combination of transfers. A combination of transfers of volumes may be selected as a solution, based on the score from the fitness function (step 820).

In various embodiments, multiple approaches to determining the combination of volume transfers may be run serially or in parallel. For example, the storage system 12 may perform the steps described in both FIGS. 7-8 to identify two or more potential combinations of volume transfers to balance the load. The combinations may be compared to select a combination to implement. In some embodiments, a combination is selected based on the real-time metrics of the storage system 12, such as the cost metrics the storage system 12 can bear at the time of transfer. Exemplary cost metrics include the amount of time a combination would require to be completed, the amount of computing resources the combination would require (e.g., I/O operations, processor cycles), the total size of the volumes transferred in a given combination, and the number of volumes transferred.

The exemplary balance constraint for two nodes ({q, 1−q}, wherein 0.5<q<1) may be adapted for additional nodes. For example, for four nodes, a balance constraint might be {q, 0.5−q, r, 0.5−r}, wherein 0.15<q<0.35 and 0.15<r<0.35. Under this example, for the load to be considered balanced, any given node 205a-205d must own between 15-35% of the read units and 15-35% of the write units executed by the storage system 12. Other distributions of the load among multiple nodes 205, according to other balance constraints, may be used.

In some embodiments, when load is being balanced across more than two nodes 205, transfers of volumes between the most loaded node 205 and the least loaded node 205 may be considered first. From the combinations of volume transfers possible using solely these two nodes 205, the combination that results in the minimum distance between the adjusted load and the ideal balanced state is selected. The adjusted load is then compared against the balance constraint. If the load still does not meet the balance constraint, the most and least loaded nodes 205 are again identified, and combinations of volume transfers between the two are again considered and evaluated against their ability to minimize the distance between the load and the ideal balanced state. These steps may be repeated until the load meets the balance constraint.

Furthermore, examples described herein apply the balance constraint to two variables, read and write units. However, the balance constraint can be expanded to multiple variables, such as deduplication activity on the nodes 205, wear level of cells of each node 205, number of storage processors 114 on each node 205 and usage thereof, and amount of available random-access memory (RAM), among others. Regardless of the number of variables used, Euclidean and/or Manhattan distances may be adapted to assess the distances between adjust loads of the storage system 12 and ideal, balanced states.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A storage system comprising:
   at least one processing device including a processor coupled to a memory;
   the at least one processing device being configured to implement the following steps:
   defining, across at least two variables, a balance constraint for a load on a storage system;
   identifying, among a set of transfers of volumes from one node to another node in the storage system, a transfer of a volume that minimizes the distance between the load and an ideal balanced state of the storage system;
   adding the identified transfer of a volume to a first combination of transfers of volumes;
   determining whether the first combination of transfers of volumes meets the balance constraint;
   if the first combination meets the balance constraint, selecting the first combination as a first potential solution to balance the load;
   determining a set of combinations of transfers of volumes from one node to another node in the storage system;
   applying, to each combination in the set, a fitness function that is based on the balance constraint;
   selecting, from the set of combinations of transfers of volumes, a second combination as a second potential solution to balance the load, based on scores output by the fitness function;
   selecting, from the first and second potential solutions, a solution to balance the load of the storage system; and
   transferring volumes according to the solution.

2. The storage system of claim 1, wherein selecting the solution comprises:
   selecting the solution based on computing resources required by the first and second potential solutions.

3. The storage system of claim 2, wherein the computing resources include input/output operations, processor cycles, total size of the volumes transferred in a combination, number of volumes transferred, and any combination thereof.

4. A storage system comprising:
   at least one processing device including a processor coupled to a memory;
   the at least one processing device being configured to implement the following steps:
   defining, across at least two variables, a balance constraint for a load on a storage system;
   identifying, among a set of transfers of volumes from one node to another node in the storage system, a transfer of a volume that minimizes a distance between the load and an ideal balanced state of the storage system;
   adding the identified transfer of a volume to a combination of transfers of volumes;
   determining whether the combination of transfers of volumes meets the balance constraint;
   if the combination meets the balance constraint, selecting the combination as a solution to balance the load; and
   transferring volumes according to the solution.

5. The storage system of claim 4, wherein the distance between the load and the ideal balanced state of the storage system is a Euclidean distance or a Manhattan distance.

6. The storage system of claim 4, the at least one processing device being further configured to implement the following steps:
   repeating the steps of identifying transfers of volumes that minimize the distance between the load and an ideal balanced state of the storage system and adding identified transfers of volumes to the combination until the combination meets the balance constraint.

7. The storage system of claim 6, the at least one processing device being further configured to implement the following steps:
   after finding the combination that meets the balance constraint, continuing to identify transfers of volumes that minimize the distance between the load and an ideal balanced state of the storage system and adding identified transfers of volumes to the combination until no further transfers of volumes reduce the distance.

8. The storage system of claim 4, the at least one processing device being further configured to implement the following steps:
   repeating the steps of identifying transfers of volumes that minimize the distance between the load and an ideal balanced state of the storage system and adding identified transfers of volumes to a combination a predetermined number of times.

9. A non-transitory computer-usable storage medium having stored therein program code of one or more software programs, wherein the program code when executed by at least one processing device causes the at least one processing device to perform the following steps:
   defining, across at least two variables, a balance constraint for a load on a storage system;
   determining combinations of transfers of volumes from one node to another node in the storage system;
   applying, to each combination of transfers of volumes, a fitness function based on the balance constraint;
   selecting a combination of transfers of volumes based on a score from the fitness function, as a solution to balance the load; and
   transferring volumes according to the solution.

10. The computer-usable medium of claim 9, wherein the fitness function evaluates a distance between a load adjusted by the combination of transfers of volumes and an ideal balanced state of the storage system.

11. The computer-usable medium of claim 9, wherein the fitness function evaluates a number of transfers of volumes in a given combination of transfers of volumes.

* * * * *